United States Patent [19]

Püntener

[11] Patent Number: 4,519,802
[45] Date of Patent: May 28, 1985

[54] USE OF 1:2 COBALT COMPLEX DYES FOR DYEING LEATHER OR FURS

[75] Inventor: Alois Püntener, Rheinfelden, Switzerland

[73] Assignee: Ciba-Geigy Corporation, Ardsley, N.Y.

[21] Appl. No.: 577,325

[22] Filed: Feb. 8, 1984

Related U.S. Application Data

[63] Continuation of Ser. No. 359,735, Mar. 19, 1982, abandoned.

[51] Int. Cl.$^3$ ............................ D06P 1/10; D06P 3/30; D06P 3/32
[52] U.S. Cl. .......................................... 8/404; 8/436; 8/437
[58] Field of Search ............................ 8/404, 436, 437

[56] References Cited

U.S. PATENT DOCUMENTS 4,085,097 4/1978 Beffa et al. ........................ 260/149
4,150,942 4/1979 Holliger et al. ........................ 8/437

FOREIGN PATENT DOCUMENTS 260455 5/1963 Australia ........................ 8/437
642408 6/1962 Canada .

Primary Examiner—Maria Parrish Tungol
Attorney, Agent, or Firm—Edward McC. Roberts; Kevin T. Mansfield

[57] ABSTRACT

The dyes of the formula I indicated in patent claim 1 are suitable for dyeing furs and especially leather.

They are preferably used as a mixture with a blue dye and a red dye for dyeing leather by the trichromatic process.

5 Claims, No Drawings

USE OF 1:2 COBALT COMPLEX DYES FOR DYEING LEATHER OR FURS

This application is a continuation of application Ser. No. 359,735, filed 3/19/82, now abandoned.

The invention relates to the use of dyes of the formula I

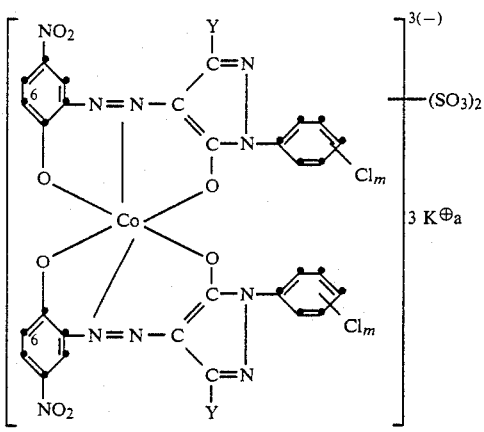

in which $Ka^\oplus$ is a cation, m is an integer from 0 to 2 and Y is methyl, $-CONH_2$ or $-CO-NH-R$, R being an alkyl group having 1–4 C atoms and there being at least one sulfo group in the diazo component, for dyeing leather or furs.

$Ka^\oplus$ is a cation, for example a cation of an alkali metal, such as lithium or, preferably, sodium or potassium. $Ka^\oplus$ can also be an ammonium cation or the ammonium salt of an organic amine.

Preferably, there is at least one sulfo group in the 6-position of the diazo component, and it is particularly preferable to use dyes of the formula I in which each monoazo dye carries a sulfo group, at least one of which is located in the diazo component. Dyes belonging to this group which are used preferably for dyeing leather or furs are those in which the two sulfo groups are located in the 6-position in the two diazo components.

m is preferably 1 and especially 0.

The alkyl group R can be straight-chain or branched. It is methyl, ethyl, n-propyl, isopropyl, n-butyl, isobutyl or tert.-butyl. Preferably, R is methyl.

In preferred dyes, Y is methyl and m is 0.

The present invention preferably relates to the use, for dyeing leather and furs, of a dye of the formula I in which the two sulfo groups are located in the 6-position in the two diazo components, m is 0 and Y is methyl.

The following are examples of pyrazolones which are suitable for the dyes of the formula I mentioned above: 1-phenyl-3-methylpyrazol-5-one, 1-(2'-, 3'-, or 4'-chlorophenyl)-3-methylpyrazol-5-one, 1-(2', 5'- or 2',3'- or 3',4'-dichlorophenyl)-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2',5'-dichloro-4'-sulfophenyl)-3-methylpyrazol-5-one or 1-phenyl-5-pyrazolone-3-carboxylic acid amide. The most preferred of these is 1-phenyl-3-methylpyrazol-5-one.

The 1:2 cobalt complexes are prepared in the customary manner, for example for reacting the metal-free azo dyes in a ratio of 1:2 with a cobalt donor. In general, the metal is introduced by using cobalt(II) salts, for example cobalt sulfate or chloride, with or without the addition of oxidising agents, for example oxygen, hydrogen peroxide or nitrobenzenesulfonic acid, or else the cobalt-(III) amine complex.

The salts mentioned above can also be used in the presence of complexing agents, for example tartaric acid, salicylic acid or lactic acid. The cobalt donors are employed in a stoichiometric quantity or in excess. It is possible to metallise mixtures or single-substance monoazo dyes. In the first case, a mixture of symmetrical and asymmetrical metal complexes is obtained.

The 1:2 cobalt complexes are used for dyeing furs or, preferably, leather, all types of leather being suitable, for example chrome leather, re-tanned leather or suede leather produced from goatskin, cowhide or pigskin.

Yellowish brown dyeings having very good fastness properties, in particular fastness to light and wet processing, are obtained.

The dyes are preferably used for dyeing leather by means of mixtures of dyes, particularly as a mixture with a blue and a red 1:2 metal complex dye, which makes it possible, for the first time, to dye leather by the trichromatic principle. In this context, red dyes are to be understood as meaning all orange to reddish brown dyes, and blue, grey or violet dyes are described as blue dyes.

It is preferable to use a mixture of dyes containing (a) a yellowish brown 1:2 cobalt complex of the formula I indicated above, (b) a blue or violet 1:2 chromium or cobalt complex of the dye of the formula II

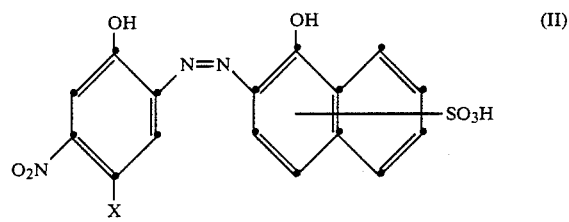

in which X is hydrogen, chlorine, methyl or methoxy, and (c) a red, reddish brown or yellowish red 1:2 chromium or cobalt complex of the dye of the formula III

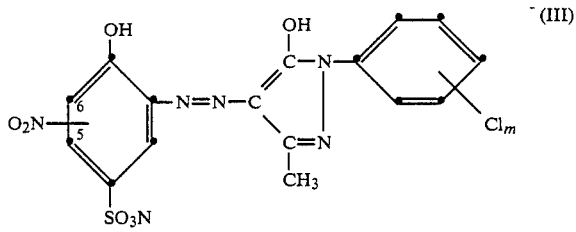

in which m is an integer from 0 to 2 and the nitro group is located in the 5-position or 6-position.

The examples which follow serve to illustrate the invention without limiting it thereto. The parts and percentages are by weight. The temperatures are quoted in degrees Centigrade.

EXAMPLE 1

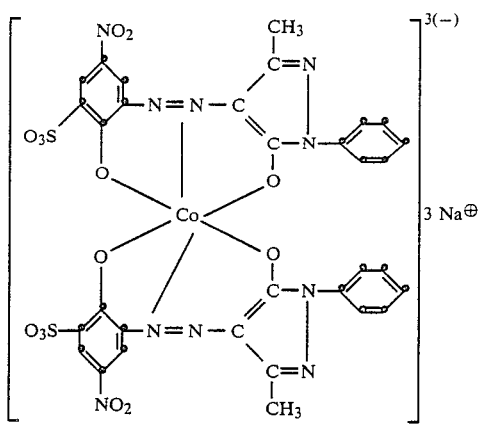

42 parts of the monoazo dye obtained by coupling diazotised 4-nitro-2-amino-1-hydroxybenzene-6-sulfonic acid with 1-phenyl-3-methylpyrazol-5-one are dissolved in 1,000 parts of water at 80°, with the aid of 4 parts of sodium hydroxide, the solution is treated with 60 parts of a 1-molar solution of cobalt sulfate and the pH is kept at 8–9 with 2-molar sodium hydroxide solution. The reaction solution is stirred at 80°–90° until the metallisation is complete, the metallisation being accelerated by adding 10 parts of 4% hydrogen peroxide solution. When the water has been removed on a rotary evaporator, a dark powder is obtained, which dyes leather in a yellowish brown colour shade which has excellent fastness properties.

EXAMPLE 2

The procedure of Example 1 is repeated, except that the reaction solution is not evaporated on a rotary evaporator, but the dye is precipitated from the aqueous solution by adding potassium chloride. The dye obtained is analogous to that in Example 1, the sodium cation being largely replaced by the potassium cation. After being dried, the resulting dye dyes leather in the same colour shade and with equivalent fastness properties. If it desired to prepare a dye containing only potassium as the cation, the monoazo dye is employed initially in the form of the potassium salt and potassium hydroxide is used to stabilise the pH.

It is only possible to displace part of the sodium by potassium by precipitating the dye by means of inorganic mixtures of sodium and potassium salts.

EXAMPLES 3–6

The procedure described in Example 1 is repeated, but using the monoazo dyes listed in Table I. 1:2 metal complexes which dye leather with equivalent fastness properties and in a similar, yellowish brown shade, are obtained.

TABLE I

| Example | Monoazo dye |
| --- | --- |
| 3 | ![structure] |
| 4 | ![structure] |
| 5 | ![structure] |
| 6 | ![structure] |

The corresponding dyes containing potassium as the cation are also obtained in accordance with Example 2.

EXAMPLE 7

21 parts of the monoazo dye obtained by coupling diazotised 4-nitro-2-amino-1-hydroxybenzene-6-sulfonic acid with 1-phenyl-3-methylpyrazol-5-one, and 22.5 parts of the monoazo dye obtained analogously by coupling diazotised 4-nitro-2-amino-1-hydroxybenzene-6-sulfonic acid with 1-(2-chlorophenyl)-3-methylpyrazol-5-one, are dissolved in 1,000 parts of water warmed at 80°, and the dyes are metallised and isolated as in Example 1. A dark powder is obtained, which dyes leather similarly in a yellowish brown colour shade having excellent fastness properties and which is the mixture of symmetrical and asymmetrical metal complexes shown below:

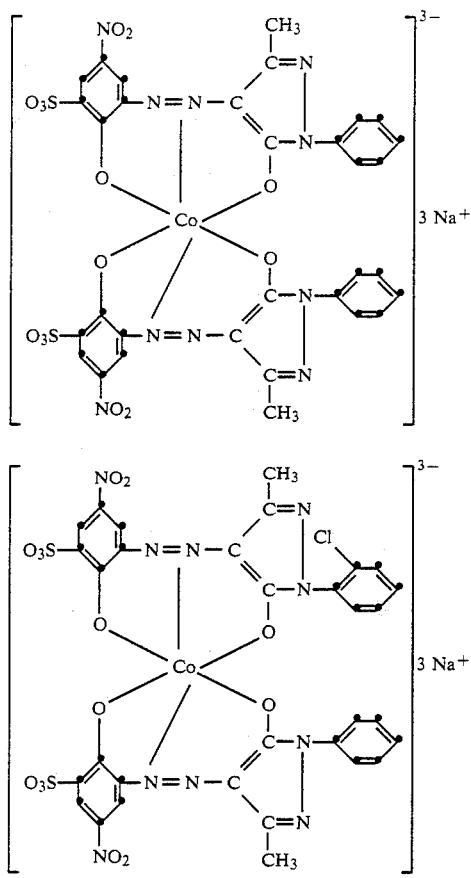

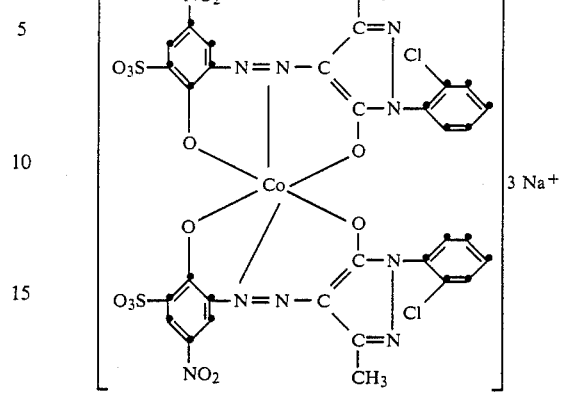

The corresponding potassium salts are obtained if the reaction is carried out as described in Example 2.

EXAMPLES 8-16

The procedure described in Example 7 is repeated, but using the monoazo dyes listed in the table which follows. Mixtures of the symmetrical and asymmetrical metal complex dyes shown below, which dye leather in yellowish brown shades having very good fastness properties, are obtained.

-continued

| Example | Azo dye I | Azo dye II |
|---|---|---|
| 11 | " | 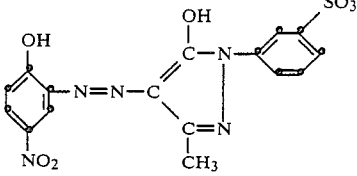 |
| 12 | " | 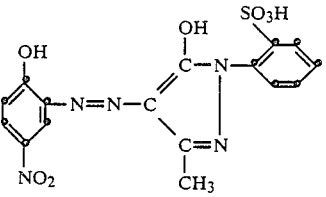 |
| 13 | " | 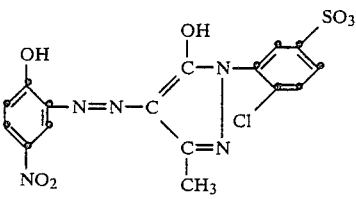 |
| 14 | " | 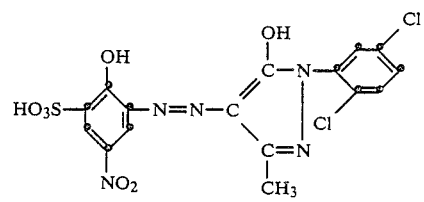 |
| 15 | 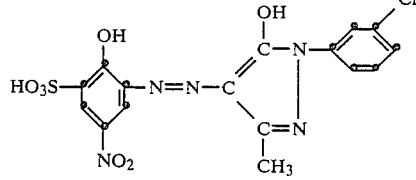 | 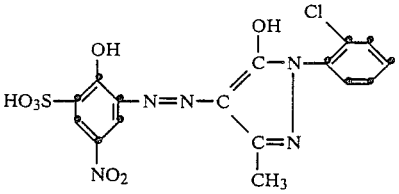<br>yellowish brown |
| 16 | " | 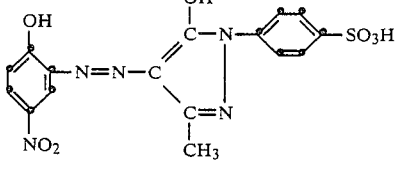<br>yellowish brown |

Dyeing instructions for leather 100 parts of suede garment leather are wetted back for 2 hours at 50° in a solution of 1,000 parts of water and 2 parts of 24% ammonia, and are then dyed for 1 hour at 60° in a solution of 1,000 parts of water, 2 parts of 24% ammonia and 3 parts of the cobalted dye according to Example 1. A solution of 40 parts of water and 4 parts of 85% formic acid is then added and dyeing is continued for a further 30 minutes. The leather is then rinsed thoroughly and, if desired, is also treated with 2 parts of a dicyandiamide-formaldehyde condensation product for 30 minutes at 50°. A yellowish brown dyeing which has good fastness properties is obtained.

What is claimed is:

1. A method of dyeing leather or furs, comprising the step of applying thereto a dye composition whose active dyeing ingredient consists essentially of a dye of the formula

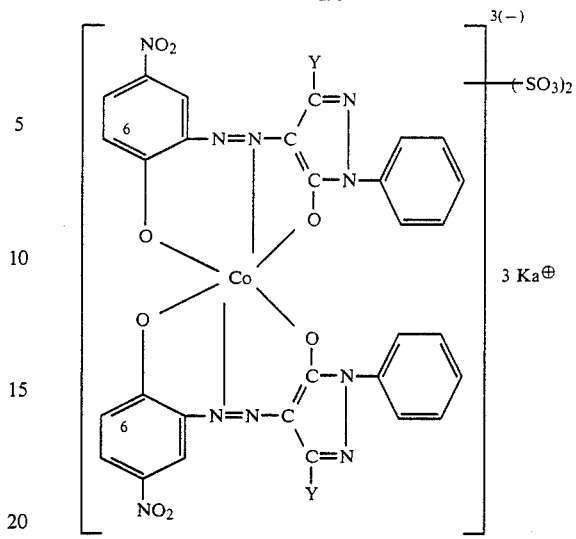

in which Ka⊕ is a cation and Y is methyl, —CONH$_2$ or —CO—NH—R, R being an alkyl group having 1-4 carbon atoms, wherein at least one of the sulfo groups is located in a diazo component.

2. The method of claim 1, wherein the two sulfo groups are each located in the 6-positions of the two diazo components.

3. The method of claim 1 or claim 2, wherein Y is methyl.

4. The method of claim 1, wherein at least one of the sulfo groups is located in the 6-position of a diazo component.

5. The method of either of claims 1 or 4, wherein each monoazo dye carries a sulfo group, at least one of which is located in the diazo component.

* * * * *